United States Patent
Yonemoto et al.

(10) Patent No.: US 7,738,458 B2
(45) Date of Patent: Jun. 15, 2010

(54) COMMUNICATION DEVICE

(75) Inventors: Shinya Yonemoto, Fukuoka (JP); Shinichi Shiwachi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 521 days.

(21) Appl. No.: 11/708,575

(22) Filed: Feb. 21, 2007

(65) Prior Publication Data
US 2007/0195767 A1    Aug. 23, 2007

(30) Foreign Application Priority Data
Feb. 23, 2006    (JP)    ............................. 2006-046477

(51) Int. Cl.
*H04L 12/28* (2006.01)
(52) U.S. Cl. .................. 370/392; 370/412; 370/474
(58) Field of Classification Search ............... 370/392, 370/412, 470, 471, 472, 474, 476
See application file for complete search history.

(56) References Cited

U.S. PATENT DOCUMENTS 6,266,337 B1 *    7/2001    Marco .................. 370/410

2006/0268913 A1 *    11/2006    Singh et al. ............. 370/412

OTHER PUBLICATIONS

Patent Abstract of Japan, Publication No. 2006-302246 published Nov. 2, 2006.

* cited by examiner

*Primary Examiner*—Jayanti K Patel
*Assistant Examiner*—Jung Park
(74) *Attorney, Agent, or Firm*—Staas & Halsey LLP

(57) ABSTRACT

A communication device simplified in circuit configuration and capable of shortening the time required to copy packets for broadcasting or multicasting. A packet separator separates an incoming packet into a data part and a header part, and a memory stores the data part. An internal packet generator attaches, to the header part, an internal header of a fixed length including the address of the stored data part, to generate an internal packet. A route searcher searches for a route for the internal packet based on the header part. Queues are associated with packet input/output ports, respectively, for temporarily storing the internal packet routed by the route searcher. A reader reads out the data part from the memory in accordance with the address included in the internal header of the internal packet. A packet generator generates an output packet from the data part and the header part of the internal packet.

5 Claims, 15 Drawing Sheets

COMMUNICATION DEVICE

CROSS-REFERENCE TO RELATED APPLICATIONS

This application is based upon and claims the benefits of priority from the prior Japanese Patent Application No. 2006-046477 filed on Feb. 23, 2006, the entire contents of which are incorporated herein by reference.

BACKGROUND OF THE INVENTION

1. Field of the Invention

The present invention relates to communication devices, and more particularly, to a communication device for routing packets.

2. Description of the Related Art

A Layer 2 switch forwards packets at the Data-link layer (Layer 2) of the OSI reference model. Ethernet® is a typical connection scheme for LANs (Local Area Networks) and concerned with the Layer 2 of the OSI reference model.

FIG. 13 illustrates routing control of a Layer 2 switch. In the figure, reference numerals $131a, 131b, \ldots, 131n$ denote packets input from n input ports, not shown. The input packets $131a, 131b, \ldots, 131n$ are routed in accordance with their header information and written in corresponding queues $132a, 132b, \ldots, 132n$ associated with n output ports, not shown. The packets $131a, 131b, \ldots, 131n$ stored in the queues $132a, 132b, \ldots, 132n$ are output thereafter from the corresponding output ports. The packets are routed on a packet-by-packet basis (Ethernet frame header+data).

The packets $131a, 131b, \ldots, 131n$ in the queues $132a, 132b, \ldots 132n$ are read out and stored in read buffers $133a, 133b, \ldots, 133n$. The packets $131a, 131b, \ldots, 131n$ stored in the read buffers $133a, 133b, \ldots, 133n$ are then read out by a read controller 134 and sent to the output ports, not shown. In FIG. 13, reference numerals $135a, 135b, \ldots, 135n$ represent packets being output to the output ports.

A Layer 2 switch not only forwards one input packet to a single route but copies an input packet to be output to multiple routes, as in broadcasting or multicasting. In the case of broadcasting or multicasting a packet, the packet is copied and the copies are stored in the corresponding queues $132a, 132b, \ldots, 132n$. In the illustrated example, the packets $131n$, namely, packets P5 and P6 are broadcast or multicast. In this case, the packets P5 and P6 ($131n$) are copied to all queues $132a, 132b, \ldots, 132n$ and are output from all output ports, as indicated by the packets $135a, 135b, \ldots, 135n$.

FIG. 14 illustrates packet copying control. As shown in the figure, a packet 141 input from an input port is copied to make n copies, which are written in the respective queues $132a, 132b, \ldots, 132n$. The packets 141 stored in the queues $132a, 132b, \ldots, 132n$ are then output from the respective output ports. In FIG. 14, the read buffers $133a, 133b, \ldots, 133n$ and the read controller 134 appearing in FIG. 13 are omitted.

Meanwhile, packets have variable lengths, and therefore, when reading packets from the queues $132a, 132b, \ldots, 132n$, the lengths of packets to be read out must be taken into account. Also, the time required to copy a packet to the queues $132a, 132b, \ldots, 132n$ is proportional to (packet length)× (number of copies), and thus varies depending on the packet length.

FIG. 15 illustrates difference in copying control according to packet lengths. Suppose the case where m shortest packets 151 or a single longest packet 152 is input, as illustrated. The total data amount of the m packets 151 is equal to the data amount of the single longest packet 152.

When copying the packet 152, the packet has only to be copied n times (n: number of output ports). On the other hand, in the case of copying the packets 151, copying operation must be performed n×m times. Thus, the short packets require more copying operations than the long packet, even though the data amounts are the same, lowering transfer efficiency. Also, where packets have different lengths such as the packets 151 and 152, the circuit for reading the packets from the queues $132a, 132b, \ldots, 132n$ is required to read the packets taking account of their packet lengths.

As conventional techniques, a network adapter has been proposed in which copying between memories of a host computer is abolished to thereby improve the memory use efficiency (see, e.g., Japanese Patent Application No. 2005-84002).

Since packets have variable lengths, the packet lengths need to be taken into account when reading packets from queues, giving rise to the problem that the configuration of the circuit for reading out packets becomes complicated.

Also, when packets are copied to queues for the purpose of broadcasting or multicasting, a long copying time is required if the packets to be copied are short in length.

SUMMARY OF THE INVENTION

The present invention was created in view of the above circumstances, and an object thereof is to provide a communication device which can be simplified in circuit configuration.

Another object of the present invention is to provide a communication device capable of shortening a time required to copy packets to queues for the purpose of broadcasting or multicasting.

To achieve the objects, there is provided a communication device for routing packets. The communication device comprises a packet separator for separating an incoming packet into a data part with a variable length and a header part with a fixed length, a memory for storing the data part, an internal packet generator for attaching, to the header part, an internal header of a fixed length including an address of the data part stored in the memory, to generate an internal packet, a route searcher for searching for a route for the internal packet based on the header part of the internal packet, queues associated with packet output ports, respectively, for temporarily storing the internal packet routed by the route searcher, a reader for reading out the data part from the memory in accordance with the address included in the internal header of the internal packet output from the queues, and a packet generator for generating an output packet from the data part read out by the reader and the header part of the internal packet.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be described below with reference to the accompanying drawings.

Figure 1:
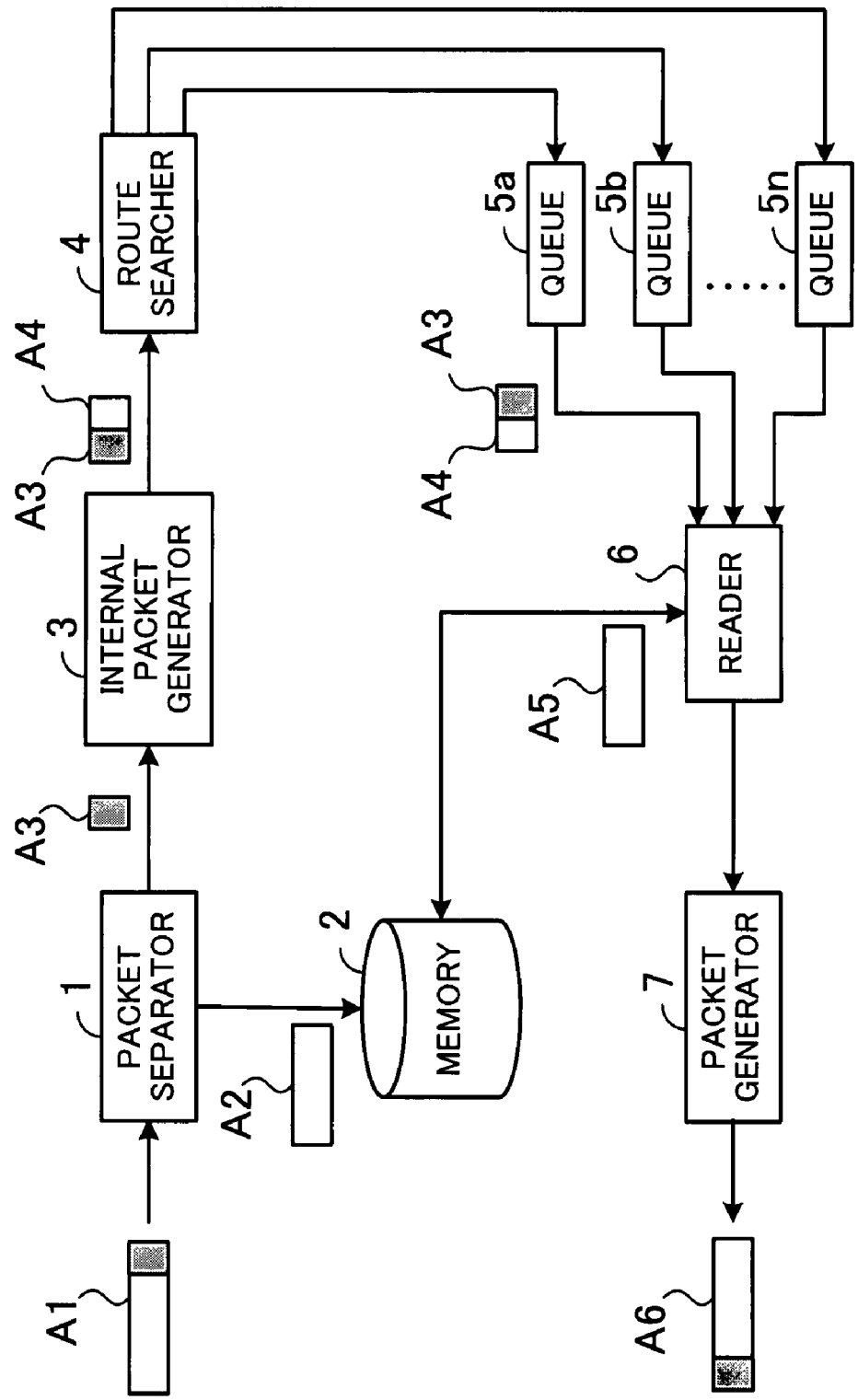
FIG. 1 schematically illustrates a communication device.

FIG. 1 schematically illustrates a communication device. As illustrated, the communication device includes a packet separator 1, a memory 2, an internal packet generator 3, a route searcher 4, queues 5a, 5b, . . . , 5n, a reader 6, and a packet generator 7.

The packet separator 1 separates a packet A1 received from a network into a data part A2 and a header part A3. The header part A3 has a fixed length.

The memory 2 stores the data part A2 separated by the packet separator 1.

The internal packet generator 3 attaches an internal header A4 of a fixed length, which includes the address of the data part A2 stored in the memory 2, to the separated header part A3 to generate an internal packet.

The route searcher 4 searches for a route for the internal packet on the basis of the header part A3 of the internal packet.

The queues 5a, 5b, . . . , 5n are associated with respective ports, not shown, which are adapted to output packets. The queues 5a, 5b, . . . , 5n temporarily store the internal packets output from the route searcher 4 and output the packets while performing bandwidth control.

The reader 6 reads out a data part A5 from the memory 2 in accordance with the address included in the internal header A4 of the internal packet output from the queues 5a, 5b, . . . , 5n.

The packet generator 7 generates an output packet A6 from the data part A5 read out by the reader 6 and the header part A3 of the internal packet. The output packet A6 is a packet obtained by routing the packet A1.

In this manner, the packet A1 is separated by the packet separator 1 into the data part A2 and the fixed-length header part A3, and the data part A2 is stored in the memory 2. The internal packet generator 3 generates an internal packet by attaching the fixed-length internal header A4, which includes the address of the data part A2 stored in the memory 2, to the header part A3.

Consequently, the internal packets temporarily stored in the queues 5a, 5b, . . . , 5n are of the same fixed length and thus can be read from the queues 5a, 5b, 5n without taking account of the packet length, making it possible to simplify the configuration of the circuit for reading out the packets.

Also, the internal packets not including the data parts A2 are temporarily stored in the queues 5a, 5b, . . . , 5n, and therefore, the time required to copy the internal packets to the queues 5a, 5b, . . . , 5n for the purpose of broadcasting or multicasting can be shortened.

A communication device according to a first embodiment of the present invention will be now described in detail with reference to the drawings, wherein the invention is applied to Layer 2 switch.

Figure 2:
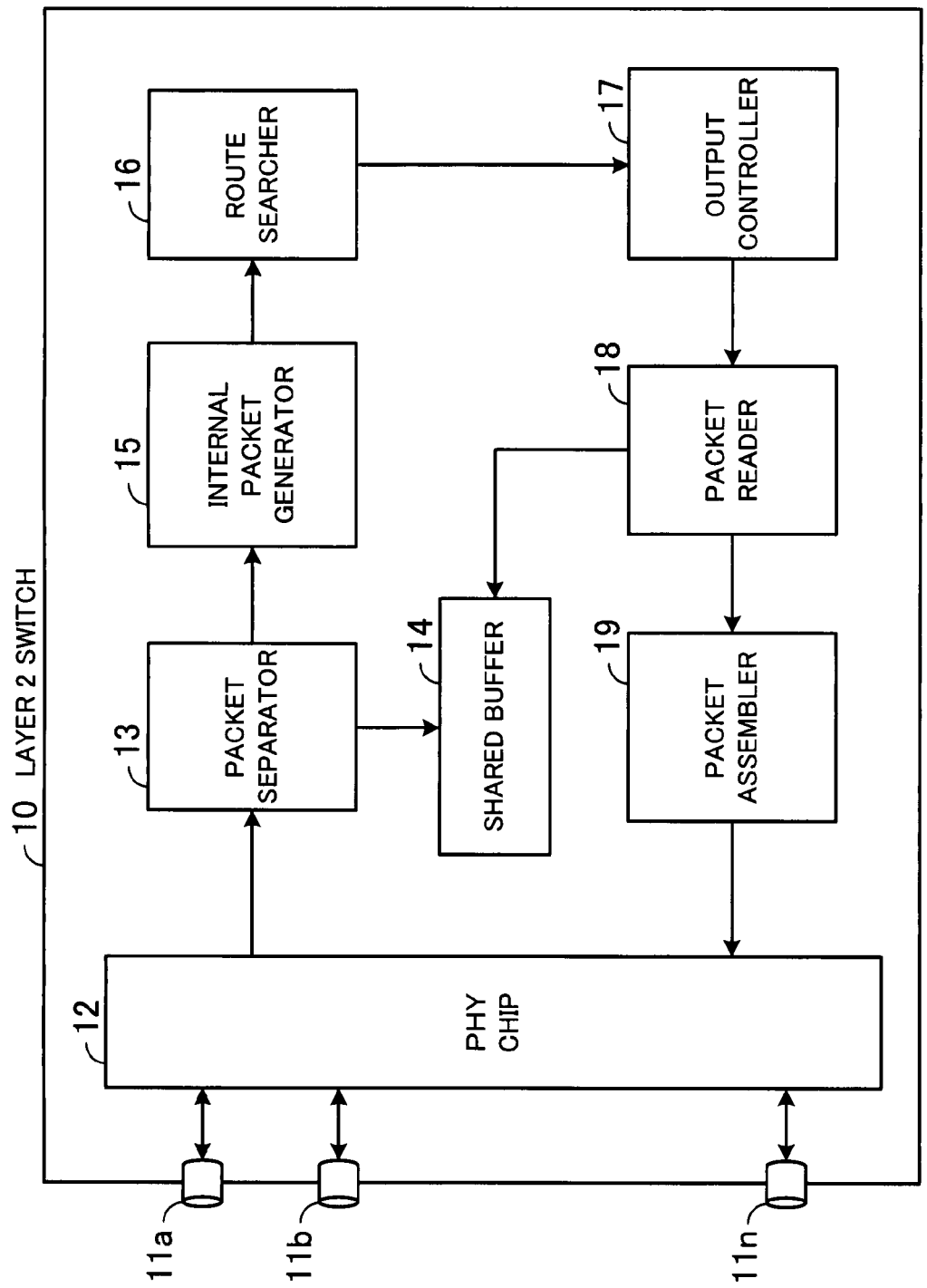
FIG. 2 is a block diagram of a Layer 2 switch according to a first embodiment.

FIG. 2 is a block diagram of a Layer 2 switch according to the first embodiment. As illustrated, the Layer 2 switch 10 includes input/output ports 11a, 11b, . . . , 11n, a Physical layer chip (hereinafter "PHY chip") 12, a packet separator 13, a shared buffer 14, an internal packet generator 15, a route searcher 16, an output controller 17, a packet reader 18, and a packet assembler 19.

The PHY chip 12 directly controls physical media. For example, the PHY chip performs signaling control for packets (Ethernet packets) input to and output from the input/output ports 11a, 11b, . . . , 11n.

The packet separator 13 separates each of packets input from the input/output ports 11a, 11b, . . . , 11n into a data part and an Ethernet frame header. Then, the packet separator 13 stores the separated data part in the shared buffer 14 and outputs the separated Ethernet frame header to the internal packet generator 15.

The shared buffer 14 is a buffer for storing the data parts separated from packets by the packet separator 13. For example, the shared buffer 14 is constituted by a memory such as RAM (Random Access Memory).

The internal packet generator 15 attaches an internal header to the Ethernet frame header separated from a packet by the packet separator 13. The internal header holds the address and length of the corresponding data part stored in the shared buffer 14. The internal packet generator 15 outputs the internal header and the Ethernet frame header combined together (hereinafter "internal packet") to the route searcher 16.

The route searcher 16 includes a CAM (Contents Addressable Memory) and searches for a route for the internal packet output from the internal packet generator 15 on the basis of the Ethernet frame header of the internal packet. Then, the route searcher 16 outputs the routed internal packet to the output controller 17.

The output controller 17 performs bandwidth control on the internal packet output from the route searcher 16. Specifically, the output controller 17 carries out bandwidth control on the internal packet in accordance with a set bandwidth and then outputs the packet to the packet reader 18.

The packet reader 18 acquires a data part from the shared buffer 14 in accordance with the internal header of the internal packet output from the output controller 17. Specifically, based on the address and the length specified by the internal header of the internal packet, the packet reader 18 acquires the corresponding data part matching the Ethernet frame header of the internal packet from the shared buffer 14. Then, the packet reader 18 outputs the data part acquired from the shared buffer 14, along with the internal packet, to the packet assembler 19.

The packet assembler 19 combines the data part and the internal packet output from the packet reader 18. Then, the packet assembler 19 deletes the internal header from the internal packet and outputs the resulting packet to the PHY chip 12.

Figure 3:
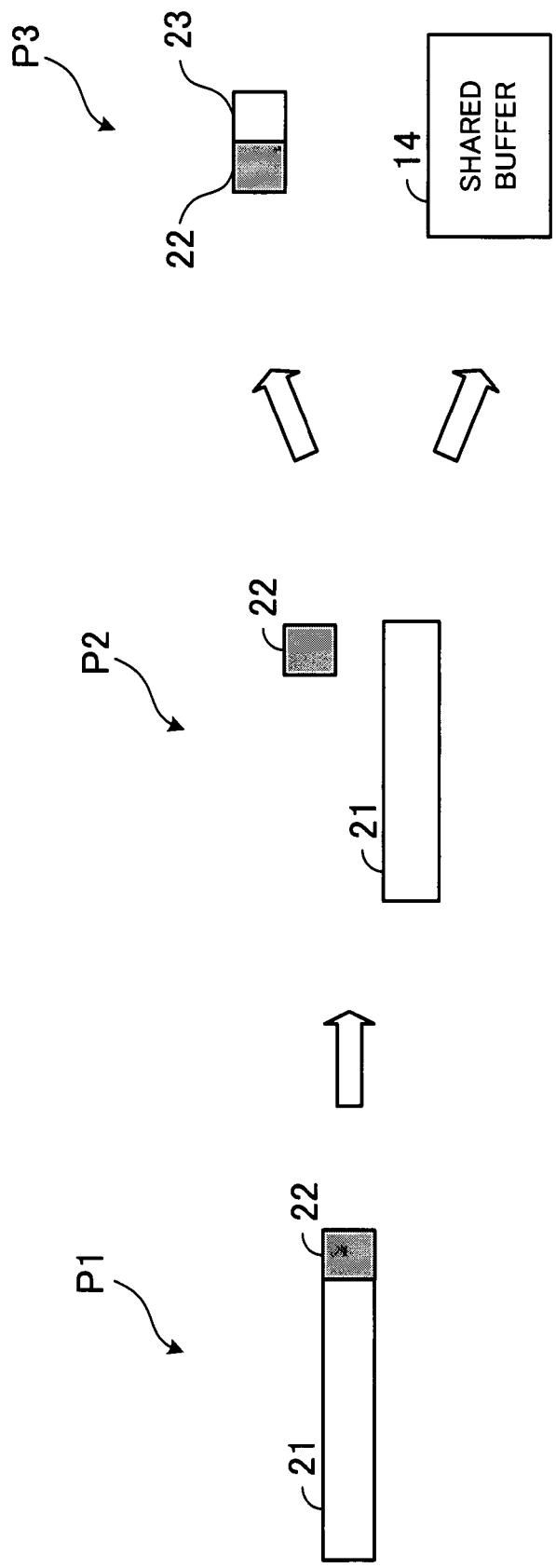
FIG. 3 illustrates how a packet is separated.

The manner of how a packet is separated will be now described with reference to FIG. 3. Arrow P1 indicates a packet composed of a data part 21 with a variable length and an Ethernet frame header 22 with a fixed length. In the Layer 2 switch 10, the packet indicated by the arrow P1 is separated into two parts as indicated by arrow P2. Then, the variable-length data part 21 is stored in the shared buffer 14 while the fixed-length Ethernet frame header 22 is combined with an internal header 23 for routing, as indicated by arrow P3.

Thus, the packet input to the Layer 2 switch 10 is separated into a variable-length part and a fixed-length part for routing, whereby the circuitry configuration can be simplified and also the time required to copy the packet for broadcasting or multicasting can be shortened.

Figure 4:
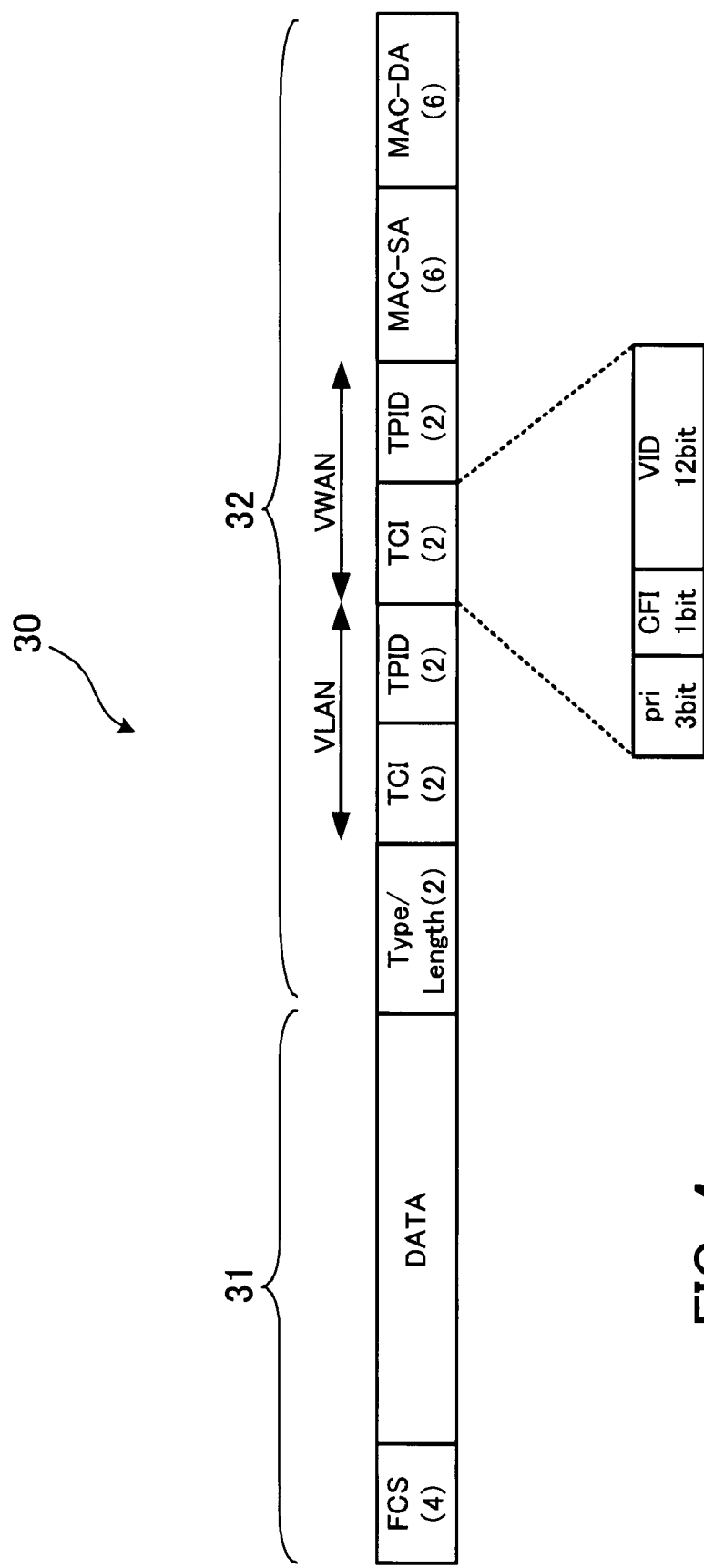
FIG. 4 shows an exemplary data structure of a packet.

An exemplary data structure of a packet will be now described with reference to FIG. 4. The illustrated packet 30 is an Ethernet packet which is separable into a data part 31 and an Ethernet frame header 32. In the figure, each parenthesized number indicates the number of bytes.

In the data part 31, DATA holds higher protocol data, and FCS (Frame Check Sequence) holds data for checking error caused during transmission.

In the Ethernet frame header 32, MAC-DA holds the destination address of the packet 30, and MAC-SA holds the source address of the packet 30. TPID (Tag Protocol Identifier) holds a tag protocol identifier, and in default settings, "0x8100" indicative of VWAN (Virtual Wide Area Network) tag is stored (modifiable). TCI (Tag Control Information) holds control information for the tag, wherein VID holds an identifier specifying a VLAN (Virtual Local Area Network) (or VWAN), CFI holds an identifier in canonical format, and pri holds priority bits indicating the priority level of the packet 30. Type/Length holds the length of the data part 31 (excluding the padding).

Figure 5:
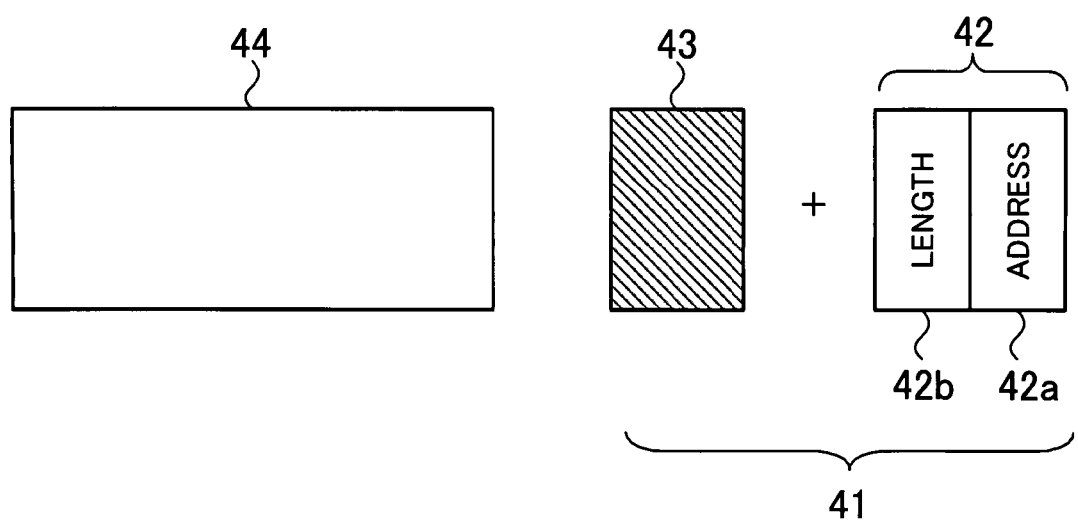
FIG. 5 shows an exemplary data structure of an internal packet.

An exemplary data structure of the internal packet output from the internal packet generator 15 will be now described with reference to FIG. 5. As illustrated, the internal packet 41 is generated by attaching an internal header 42 to the Ethernet frame header 43. In the figure, the data part 44 is also shown. The internal header 42 of the internal packet 41 has fields 42a and 42b, which hold the address and length, respectively, of the data part 44 stored in the shared buffer 14. The address and the length are stored in the respective fields 42a and 42b by the internal packet generator 15.

The size of the field 42a of the internal header 42 is set, for example, to four bytes, though it depends on the address width of the shared buffer 14. The size of the field 42b is set, for example, to two bytes, though it depends on the size of the data part 44.

Routing control of the Layer 2 switch 10 will be now described with reference to FIG. 6. The figure shows the shared buffer 14 and the output controller 17, both explained above with reference to FIG. 2. The output controller 17 includes queues 17a, 17b, . . . , 17n as illustrated, which are associated with the input/output ports 11a, 11b, . . . , 11n.

Figure 6:
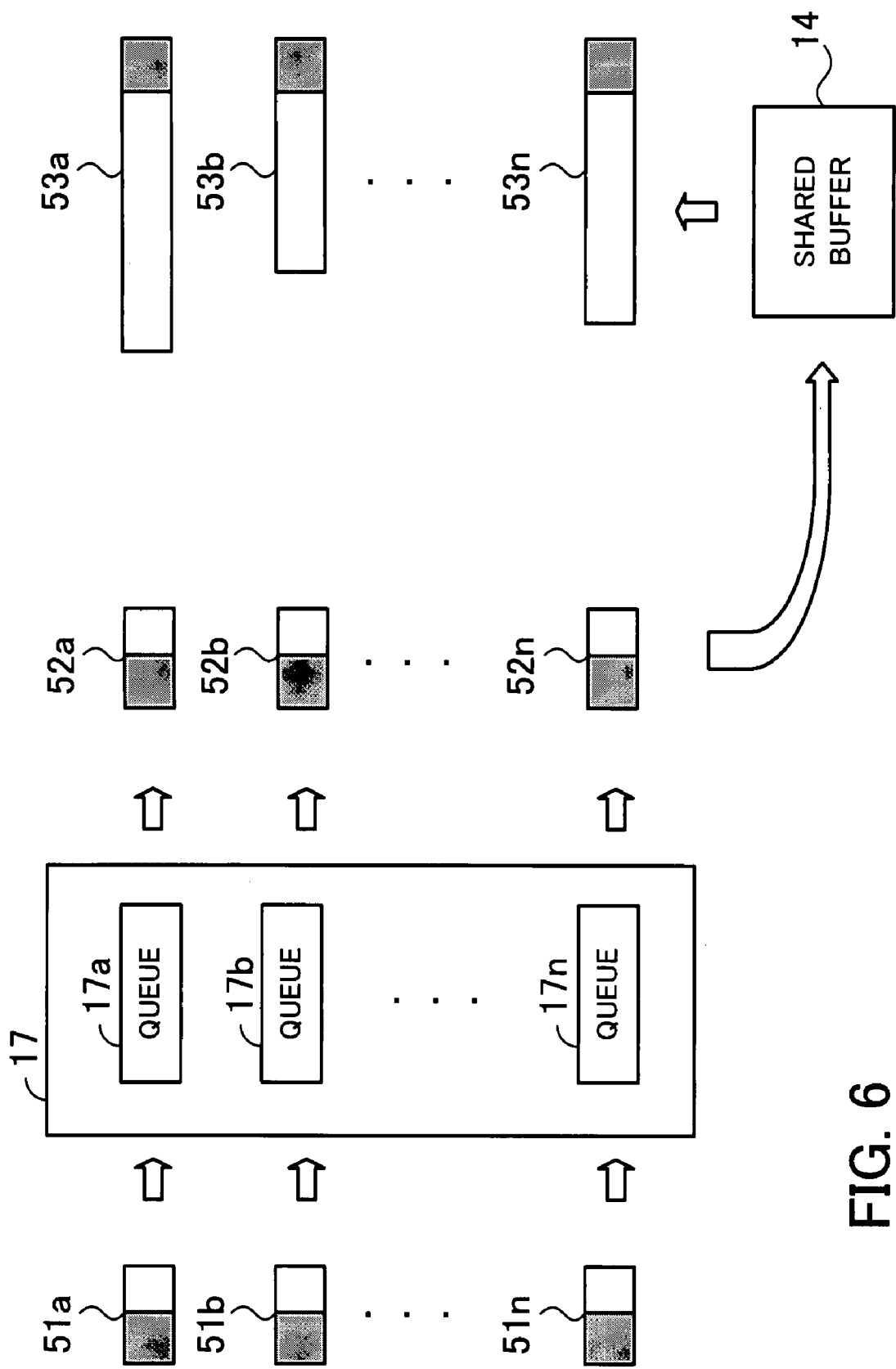
FIG. 6 illustrates routing control of the Layer 2 switch.

In FIG. 6, reference numerals 51a, 51b, . . . , 51n denote internal packets output from the route searcher 16 shown in FIG. 2. The internal packets 51a, 51b, . . . , 51n are routed in accordance with their Ethernet frame headers and stored in the corresponding queues 17a, 17b, . . . , 17n.

The output controller 17 outputs the internal packets from the queues 17a, 17b, . . . , 17n while performing bandwidth control. In FIG. 6, reference numerals 52a, 52b, . . . , 52n represent the internal packets output after being subjected to the bandwidth control.

The internal packets 52a, 52b, . . . , 52n output from the output controller 17 are input to the packet reader 18 explained above with reference to FIG. 2. Based on the addresses and lengths specified by the internal headers of the internal packets 52a, 52b, . . . , 52n, the packet reader 18 acquires the corresponding data parts matching the respective Ethernet frame headers from the shared buffer 14.

The data parts acquired from the shared buffer 14 are combined with the respective Ethernet frame headers obtained by deleting the internal headers from the internal packets 52a, 52b, . . . , 52n. In FIG. 6, reference numerals 53a, 53b, . . . , 53n denote packets obtained by combining the data parts with the respective Ethernet frame headers. The packets 53a, 53b, . . . , 53n are output from the input/output ports 11a, 11b, . . . , 11n explained above with reference to FIG. 2.

Figure 7:
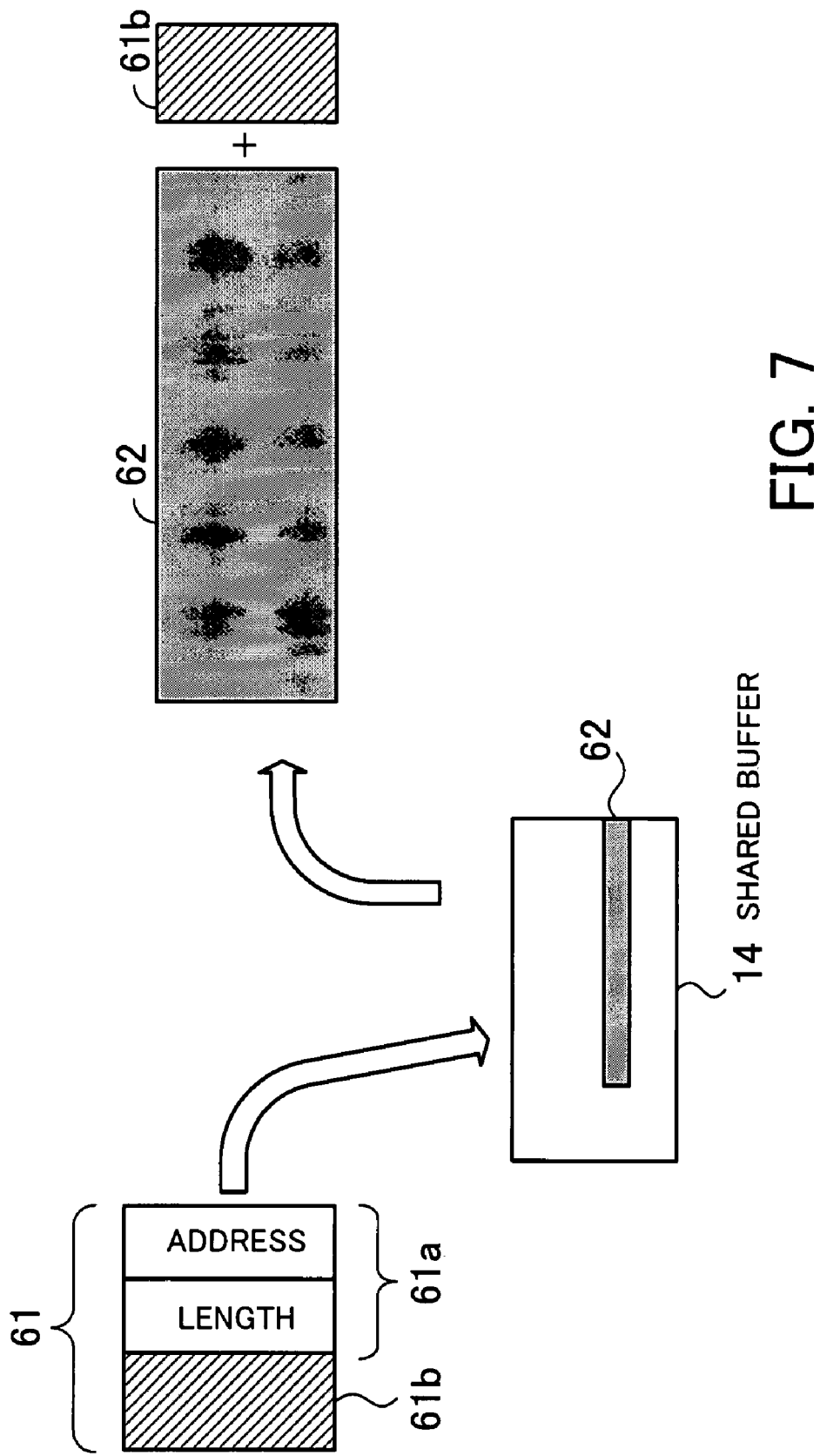
FIG. 7 illustrates how a packet is assembled.

Packet assembling will be now described with reference to FIG. 7. The figure shows an internal packet 61 consisting of an internal header 61a and an Ethernet frame header 61b, along with the shared buffer 14.

A data part 62 stored in the shared buffer 14 is acquired therefrom on the basis of the address and length specified in the internal header 61a. For example, data beginning from the address specified by the internal header 61a and ranging over the length specified by the same internal header is acquired as the data part 62. The acquired data part 62 is combined with the Ethernet frame header 61b which is obtained by deleting the internal header 61a from the internal packet 61. Packets are generated in this manner and output from the corresponding input/output ports 11a, 11b, . . . , 11n.

The following describes copying control executed in cases where a packet is to be broadcast or multicast.

Figure 8:
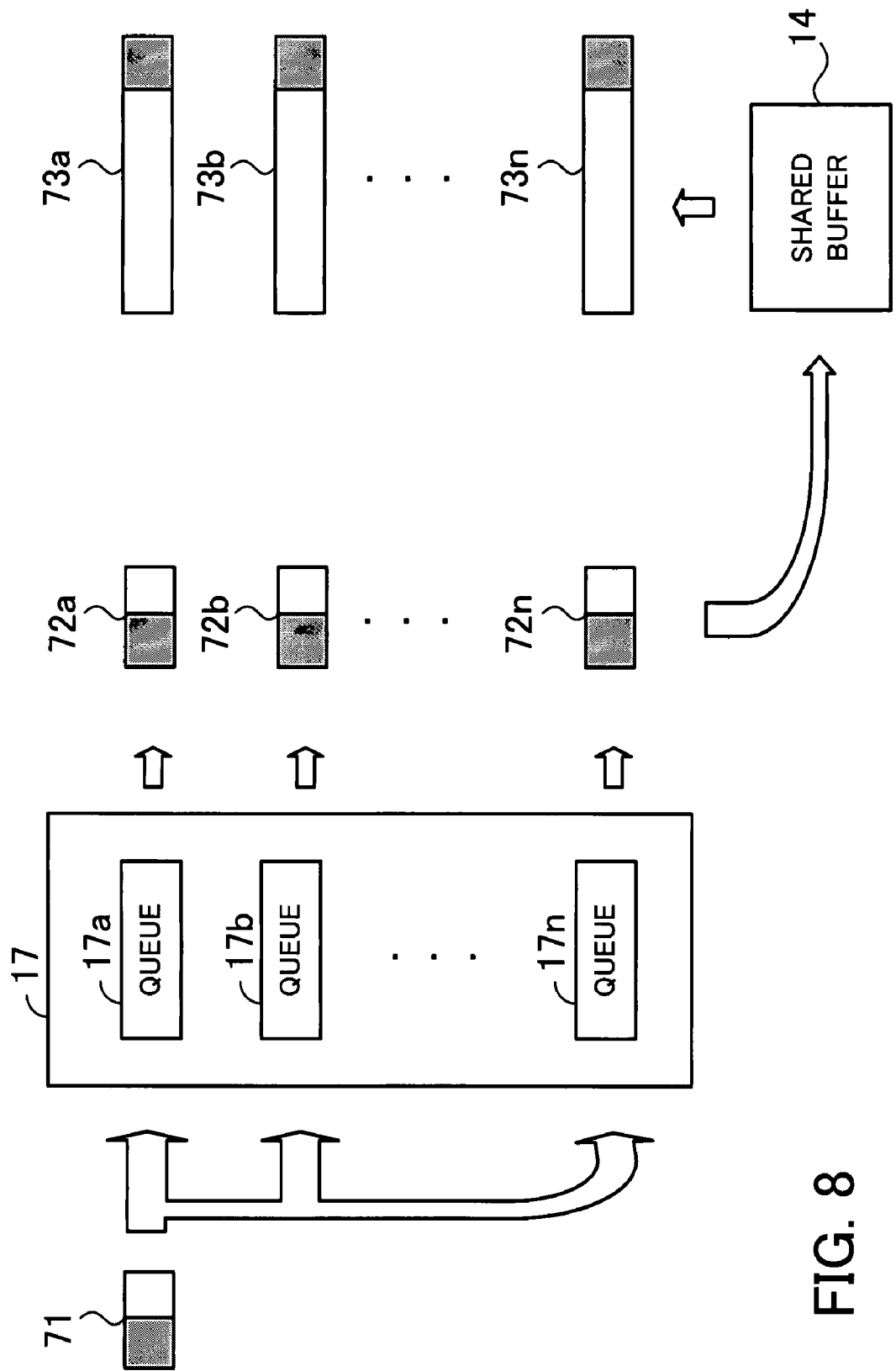
FIG. 8 illustrates packet copying control.

FIG. 8 illustrates such packet copying control, wherein the shared buffer 14 and the output controller 17 are shown.

Where a packet is to be broadcast or multicast, the route searcher 16 shown in FIG. 2 makes n copies of the corresponding internal packet 71 and outputs the copies to the respective queues 17a, 17b, . . . , 17n of the output controller 17.

The output controller 17 outputs the internal packets 71 from the queues 17a, 17b, . . . , 17n while carrying out bandwidth control. In FIG. 8, reference numerals 72a, 72b, . . . , 72n denote the internal packets output after being subjected to the bandwidth control.

The internal packets 72a, 72b, . . . , 72n output from the output controller 17 are input to the packet reader 18 explained above with reference to FIG. 2. Based on the address and length specified by the internal headers of the internal packets 72a, 72b, . . . , 72n, the packet reader 18 acquires the corresponding data part matching the Ethernet frame headers from the shared buffer 14.

The data part acquired from the shared buffer 14 is combined with each of the Ethernet frame headers which are obtained by deleting the internal headers from the respective internal packets 72a, 72b, . . . , 72n. In FIG. 8, reference numerals 73a, 73b, . . . , 73n represent the packets obtained by attaching the data part to the individual Ethernet frame headers. The packets 73a, 73b, . . . , 73n are output from the respective input/output ports 11a, 11b, . . . , 11n shown in FIG. 2.

Figure 9:
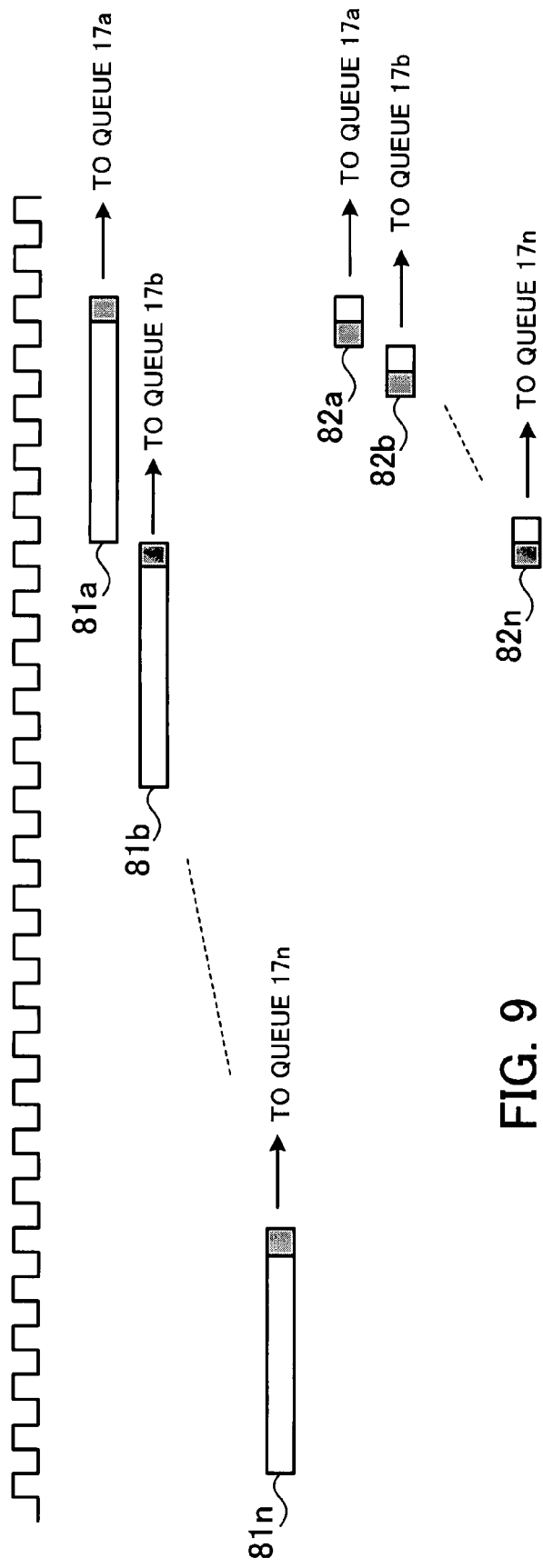
FIG. 9 illustrates why a copying time is shortened.

The reason why the copying time is shortened will be now explained with reference to FIG. 9. In the figure, reference numerals 81a, 81b, . . . , 81n denote packets copied in a conventional Layer 2 switch, and reference numerals 82a, 82b, . . . , 82n denote internal packets copied in the Layer 2 switch 10 shown in FIG. 2. Also, clock pulses are shown in the figure to indicate copying times of the packets 81a, 81b, . . . , 81n and the internal packets 82a, 82b, . . . , 82n. As seen from the figure, the packet 81a, for example, requires a copying time corresponding to five clock pulses.

The queues 17a, 17b, . . . , 17n are associated with the input/output ports 11a, 11b, . . . , 11n and thus are equal in number to the ports 11a, 11b, . . . , 11n. In the Layer 2 switch, the input/output ports 11a, 11b, . . . , 11n that are to output the packets 81a, 81b, . . . , 81n are determined in accordance with the Ethernet frame headers, and the packets 81a, 81b, . . . , 81n are stored in the corresponding queues 17a, 17b, . . . , 17n. At this time, the packets 81*a*, 81*b*, ..., 81*n* are serially written in the corresponding queues 17*a*, 17*b*, ..., 17*n*, requiring a total write time shown in FIG. 9.

In the conventional Layer 2 switch, the packets 81*a*, 81*b*, ..., 81*n*, inclusive of their data parts, are written in the corresponding queues 17*a*, 17*b*, ..., 17*n*. On the other hand, in the Layer 2 switch 10 shown in FIG. 2, the fixed-length internal packets 82*a*, 82*b*, ..., 82*n* each consisting of an Ethernet frame header and an internal header are written in the corresponding queues 17*a*, 17*b*, ..., 17*n*. Consequently, the time required to write the packets in the queues 17*a*, 17*b*, ..., 17*n* can be shortened.

Specifically, to write the internal packets 82*a*, 82*b*, ..., 82*n* in the queues 17*a*, 17*b*, ..., 17*n*, a time corresponding to (internal packet length (fixed length))×(number of ports) is required, which is shorter than that required in the conventional switch, namely, the time corresponding to (packet length (variable length))×(number of copies). Even in cases where the internal packets are compared with the shortest packets, the required copying time is shorter because the length of the internal packet is shorter than that of the shortest packet. Further, since the internal packets are fixed in length, the copying time required to copy a packet does not vary depending on the packet length but is uniform.

Also, where packets are continuously written in the queues 17*a*, 17*b*, ..., 17*n* one after another, the second and subsequent packets have to wait (are blocked) until the first packet is stored in the corresponding queue. The greater the number of copies, the longer time is required to write packets in the queues 17*a*, 17*b*, ..., 17*n*. In the case of the conventional Layer 2 switch, the blocking time over which packets are blocked is so long that throughput lowers. In the Layer 2 switch 10 shown in FIG. 2, on the other hand, the blocking time is short because the internal packets are short in length, whereby throughput improves.

Moreover, since the internal packets are fixed in length, the circuit for reading out the internal packets from the queues 17*a*, 17*b*, ..., 17*n* has only to read out fixed-size data. Accordingly, the configuration of the circuit can be simplified, compared with a circuit adapted to read out variable-length data.

Thus, in the Layer 2 switch 10, a packet is separated into a data part with a variable length and an Ethernet frame header with a fixed length, and the data part is stored in the shared buffer 14. The internal packet generator 15 generates an internal packet by attaching a fixed-length internal header, which includes the address and length of the data part stored in the shared buffer 14, to the Ethernet frame header.

Consequently, the internal packets temporarily stored in the queues 17*a*, 17*b*, ..., 17*n* have the same fixed length and thus can be read from the queues 17*a*, 17*b*, ..., 17*n* without taking account of the packet lengths, whereby the circuit configuration can be simplified.

Also, the internal packets not including the data parts are temporarily stored in the queues 17*a*, 17*b*, ..., 17*n*, and accordingly, the time required to copy the internal packets to the queues 17*a*, 17*b*, ..., 17*n* for the purpose of broadcasting or multicasting can be shortened. Moreover, the packet transfer efficiency can be improved.

A second embodiment of the present invention will be now described in detail with reference to the drawings. In the second embodiment, each internal header holds a checksum so that normalcy can be checked at the time of packet assembling.

Figure 10:
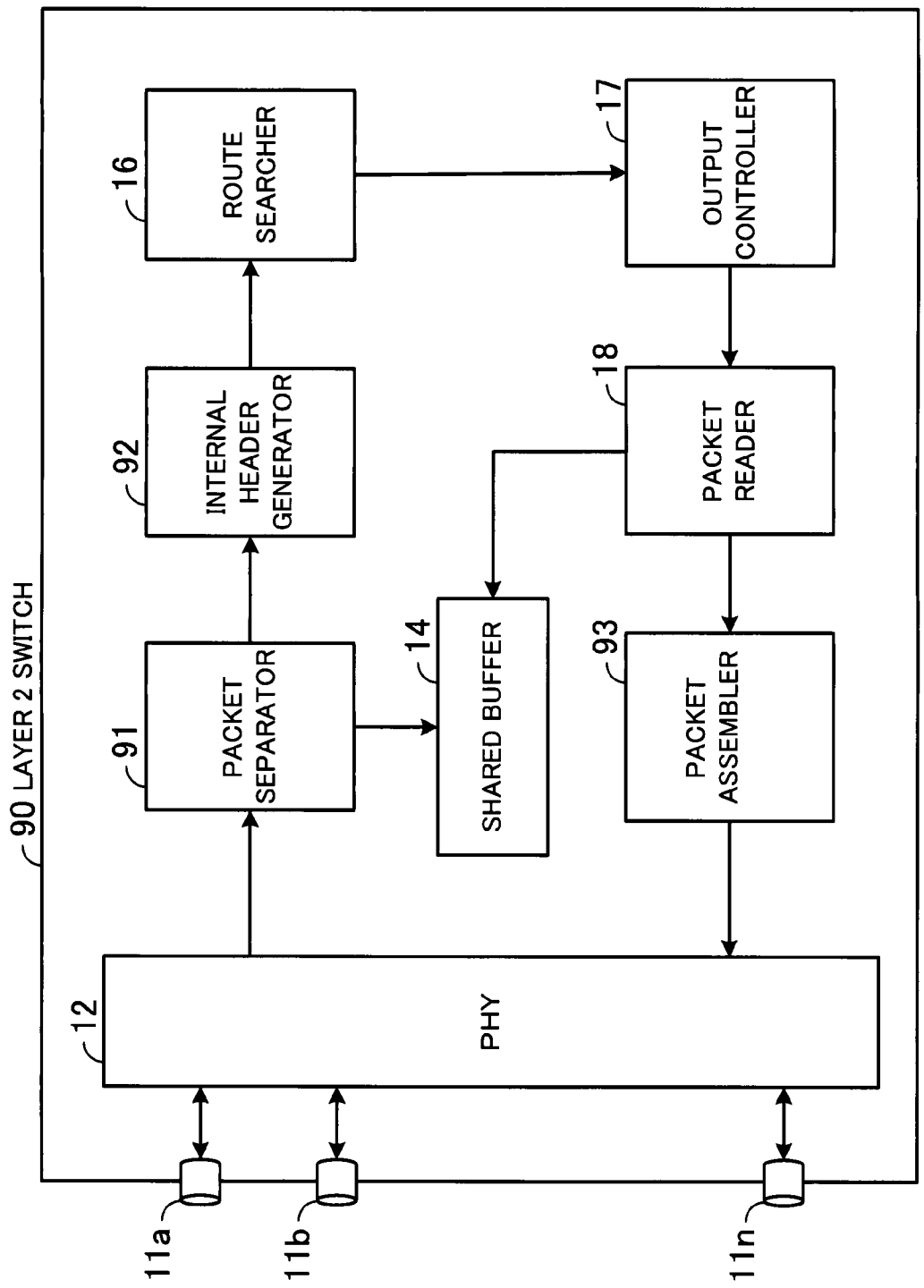
FIG. 10 is a block diagram of a Layer 2 switch according to a second embodiment.

FIG. 10 is a block diagram of a Layer 2 switch according to the second embodiment. In FIG. 10, like reference numerals are used to denote like elements appearing in FIG. 2, and description of such elements is omitted.

A packet separator 91 separates a packet input from any of the input/output ports 11*a*, 11*b*, ..., 11*n* into a data part and an Ethernet frame header, and calculates a checksum value of the separated data part. Then, the packet separator 91 stores the separated data part in the shared buffer 14, and outputs the calculated checksum value and the separated Ethernet frame header to an internal header generator 92.

The internal header generator 92 attaches an internal header to the Ethernet frame header separated from the packet by the packet separator 91. The internal header holds the address and length of the data part stored in the shared buffer 14 as well as the checksum value. The internal header generator 92 then outputs the internal header and the Ethernet frame header combined together (hereinafter "internal packet") to the route searcher 16.

A packet assembler 93 combines the data part with the internal packet, both output from the packet reader 18, and deletes the internal header from the internal packet to generate a packet. Then, the packet assembler 93 calculates a checksum value of the data part of the generated packet and compares the calculated checksum value with the checksum value included in the internal header of the internal packet. If the two checksum values coincide, the packet assembler outputs the generated packet to the PHY chip 12; if not, the packet assembler discards the generated packet.

The internal packet used in the second embodiment will be now described.

Figure 11:
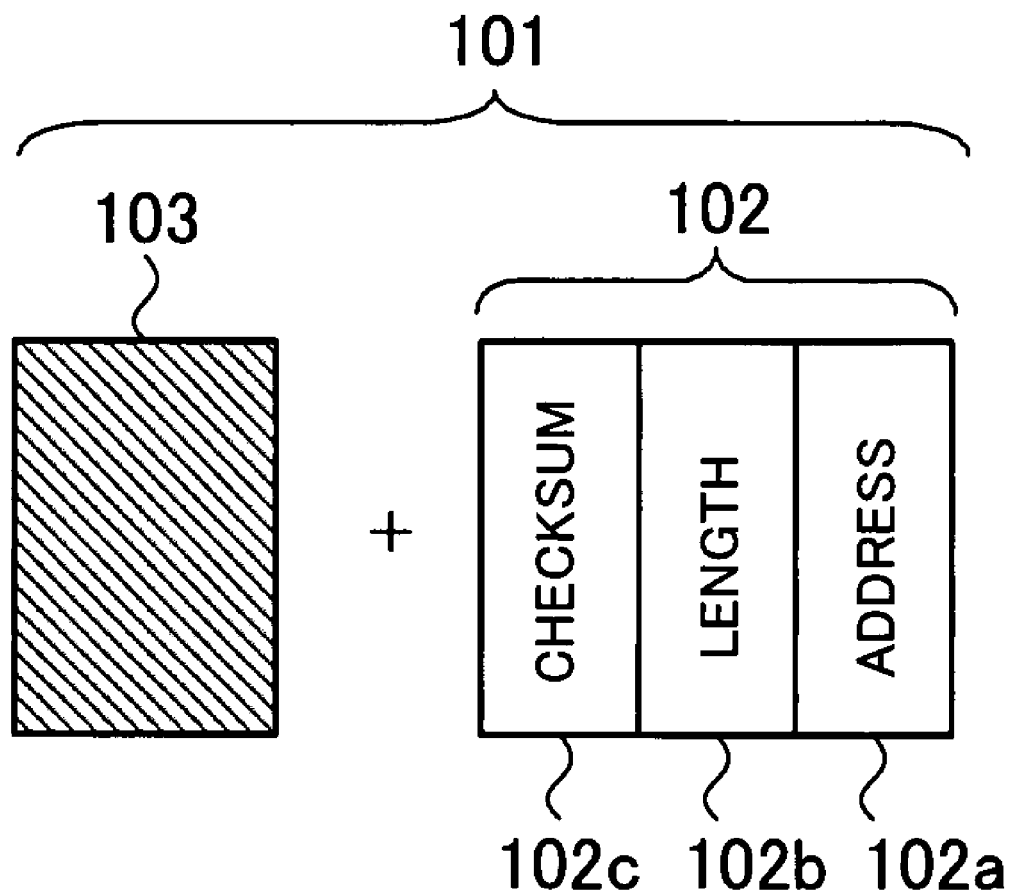
FIG. 11 shows an exemplary data structure of an internal packet.

FIG. 11 shows an exemplary data structure of the internal packet. As illustrated, the internal packet 101 is constituted by an internal header 102 and an Ethernet frame header 103.

The internal header 102 has fields 102*a* to 102*c*. The fields 102*a* and 102*b* hold the address and length, respectively, of the corresponding data part stored in the shared buffer 14 shown in FIG. 10. The field 102*c* holds the checksum value of the corresponding data part stored in the shared buffer 14.

The address and the length are stored in the respective fields 102*a* and 102*b* by the internal header generator 92. The checksum value is calculated by the packet separator 91 and stored in the field 102*c* by the internal header generator 92. The size of the field 102*c* is, for example, two bytes.

Figure 12:
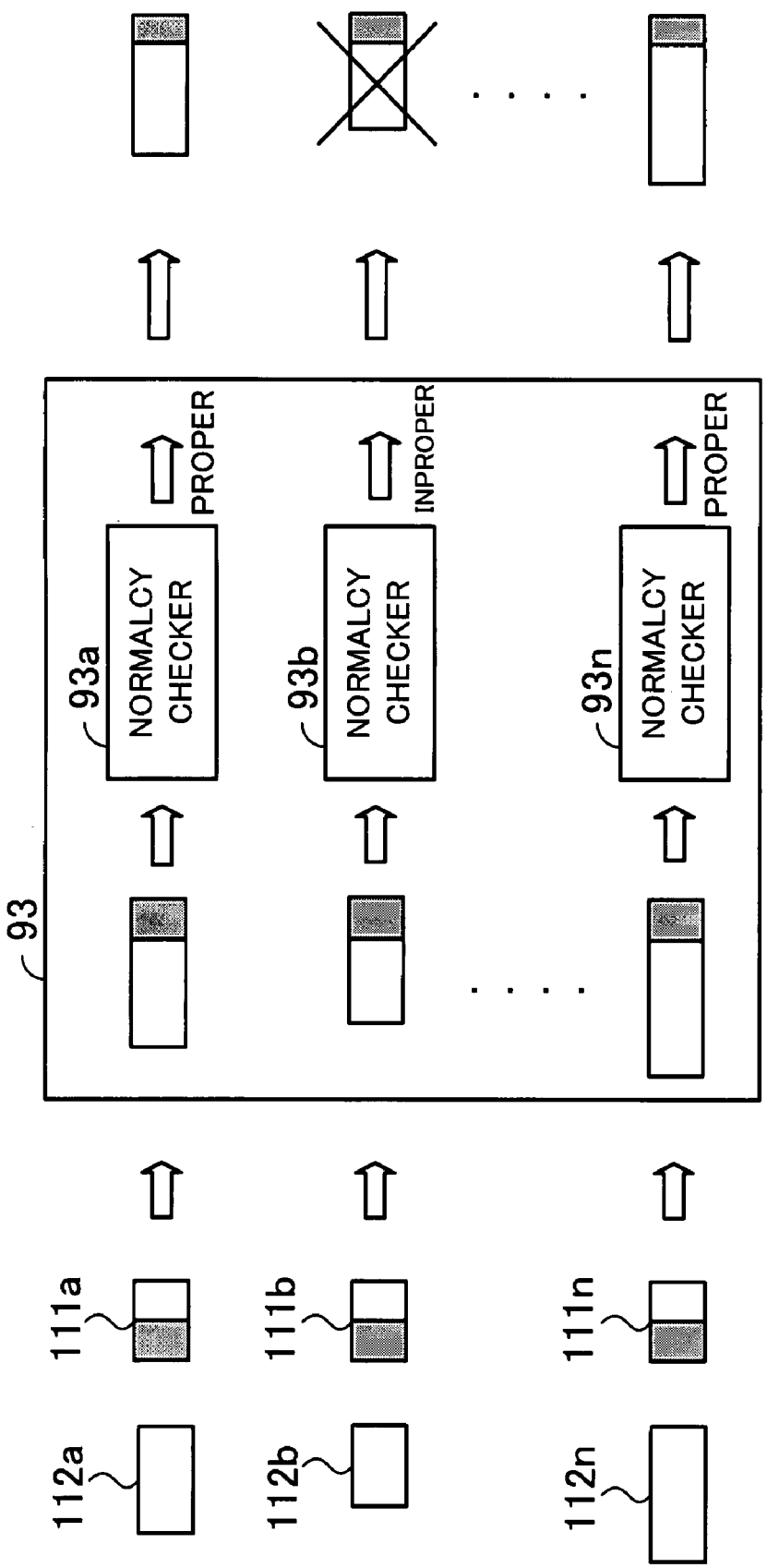
FIG. 12 illustrates how packets are assembled.
Figure 13:
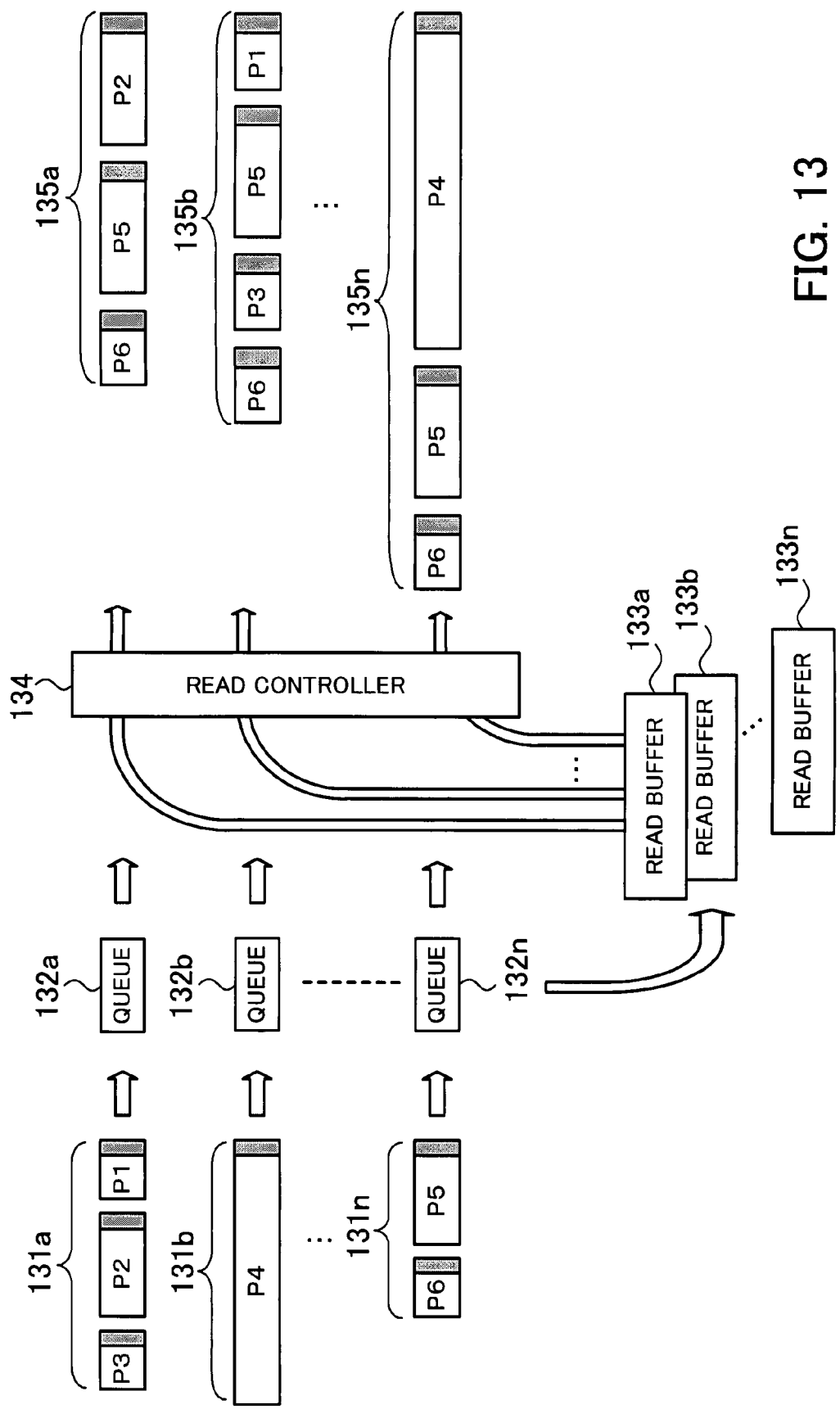
FIG. 13 illustrates routing control of a Layer 2 switch.
Figure 14:
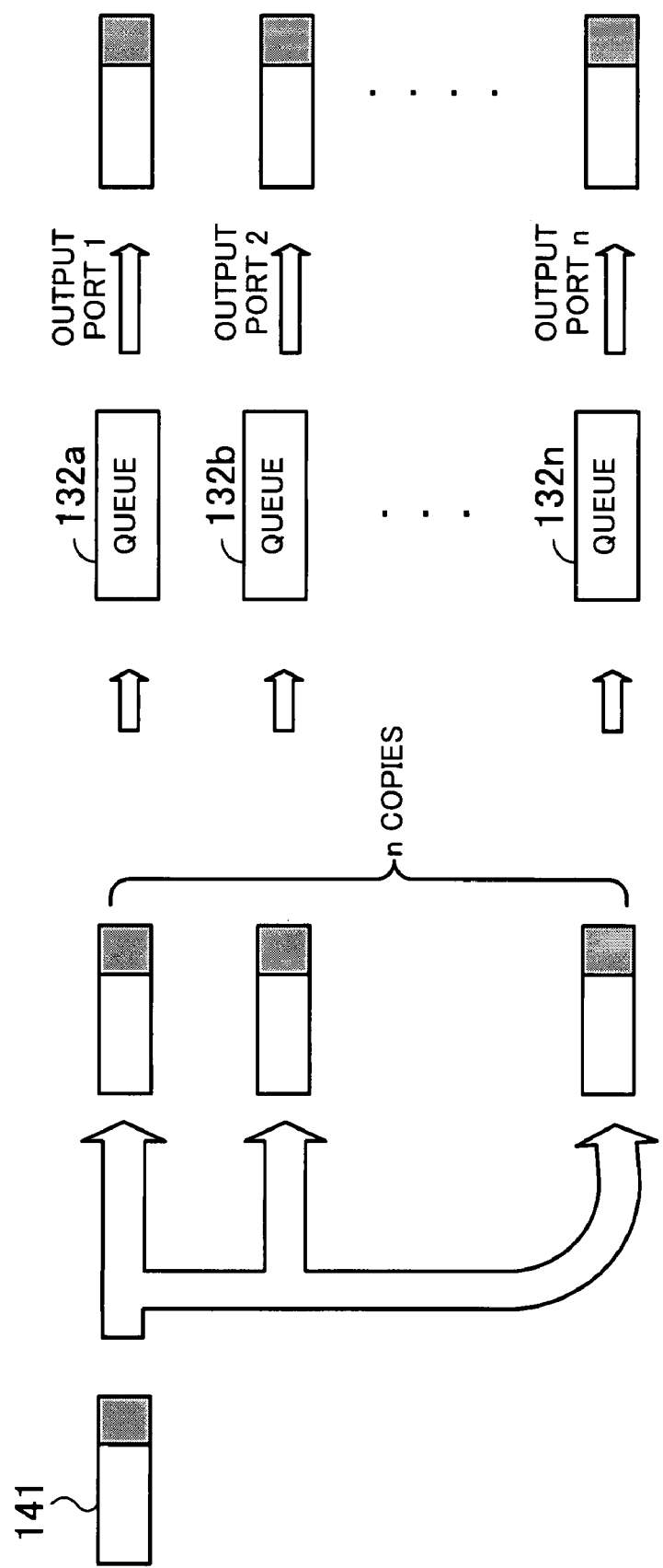
FIG. 14 illustrates packet copying control.
Figure 15:
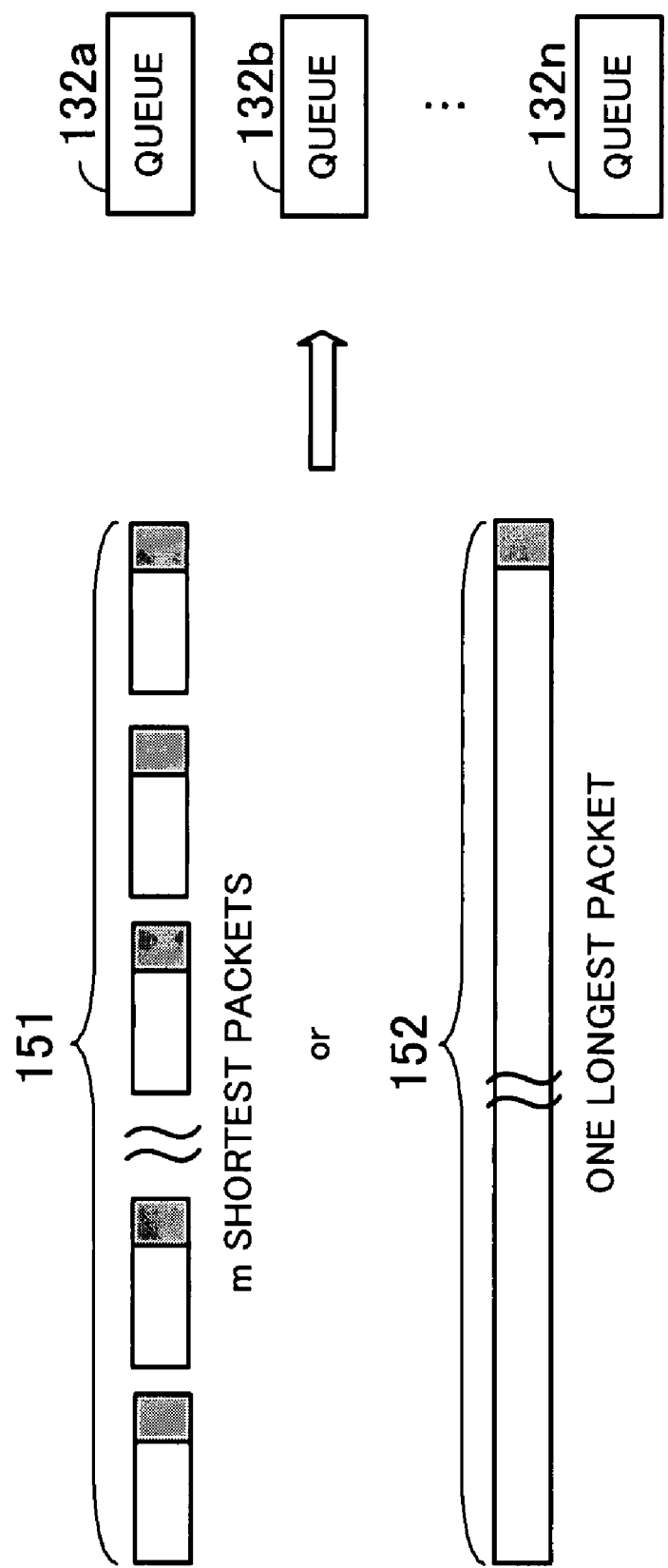
FIG. 15 illustrates difference in copying control according to packet lengths.

Packet assembling will be now described with reference to FIG. 12. As illustrated, the packet assembler 93 includes normalcy checkers 93*a*, 93*b*, ..., 93*n*.

The packet assembler 93 is input with internal packets 111*a*, 111*b*, ..., 111*n* and data parts 112*a*, 112*b*, ..., 112*n* from the packet reader 18. The packet assembler 93 combines the input internal packets 111*a*, 111*b*, ..., 111*n* with the respective data parts 112*a*, 112*b*, ..., 112*n* and deletes the internal headers from the individual internal packets 111*a*, 111*b*, ..., 111*n* to generate packets.

The normalcy checkers 93*a*, 93*b*, ..., 93*n* calculate checksum values of the data parts of the generated packets and compare the calculated checksum values with the checksum values included in the respective internal headers of the internal packets 111*a*, 111*b*, ..., 111*n*. If the calculated checksum value agrees with the corresponding checksum value, it is judged that the data part read from the shared buffer 14 is proper, and the assembled packet is output to the PHY chip 12. If the checksum values do not coincide, it is concluded that the data part read from the shared buffer 14 is not proper, so that the assembled packet is discarded.

By checking the checksum values of the data parts in this manner, it is possible to restrain improper packets from being output, thereby enhancing reliability.

In the communication device of the present invention, internal packets with a fixed length are temporarily stored in the queues. Accordingly, the internal packets can be read from the queues without taking the packet lengths into account, whereby the configuration of the circuit for reading out the internal packets can be simplified.

Also, the internal packets temporarily stored in the queues do not include the data parts, and this makes it possible to shorten the copying time required to copy the internal packets to the queues for the purpose of broadcasting or multicasting.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device for routing packets, comprising:
   a packet separator to separate a packet received from a network into a data part with a variable length and a header part with a fixed length;
   a memory to store the data part separated by the packet separator;
   an internal packet generator to generate a fixed-length internal packet by generating a fixed-length internal header including an address of the separated data part and attaching the generated fixed-length internal header to the separated fixed-length header part;
   a route searcher to search for a route for the fixed-length internal packet based on the header part of the fixed-length internal packet;
   a plurality of queues associated with respective packet output ports for storing the fixed-length internal packet routed by the route searcher;
   a reader to read out the data part from the memory in accordance with the address included in the fixed-length internal header of the fixed-length internal packet output from the queues; and
   a packet generator to generate an output packet from the variable-length data part read out of the memory by the reader and the header part of the fixed-length internal packet read out of the corresponding queue.

2. The communication device according to claim 1, wherein the internal packet generator includes a checksum value of the data part in the fixed-length internal header.

3. The communication device according to claim 2, wherein the packet generator compares a checksum value of the data part read out by the reader with the checksum value included in the fixed-length internal packet, and generates the output packet in accordance with a comparison result.

4. The communication device according to claim 1, wherein the internal packet generator includes a length of the data part in the fixed-length internal header.

5. The communication device according to claim 4, wherein the reader reads out the data part in accordance with the address and the length included in the fixed-length internal header of the fixed-length internal packet.

* * * * *